Jan. 8, 1924.                                                    1,480,096
E. MOORE
ADJUSTABLE FLEXIBLE SHAFT COUPLING
Filed Oct. 7, 1921
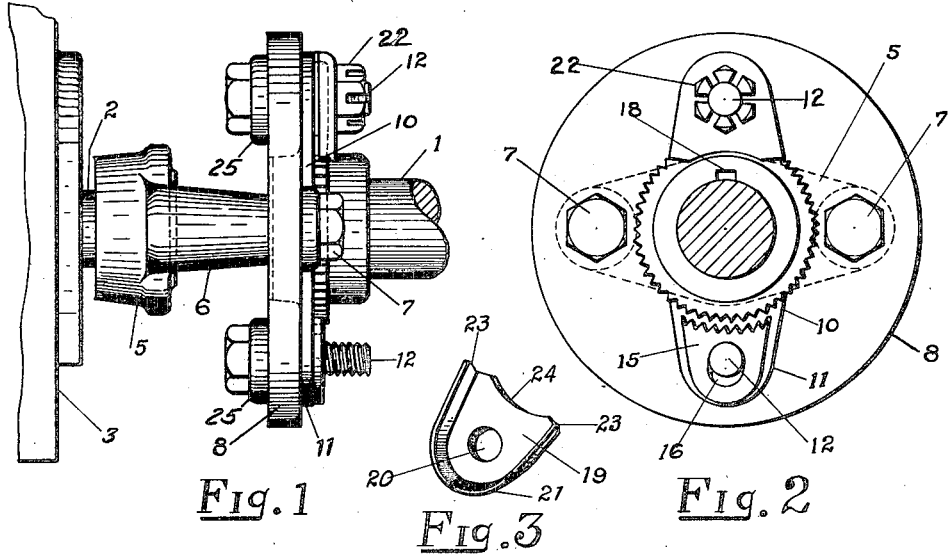
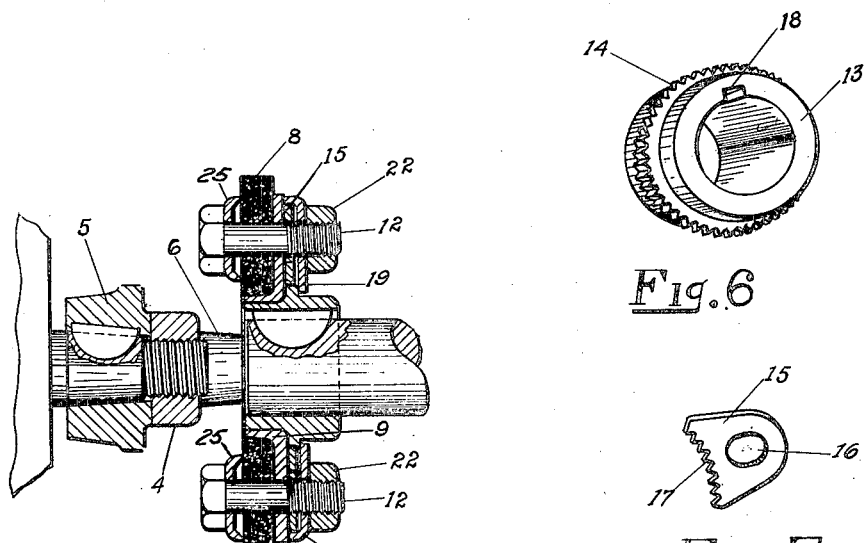
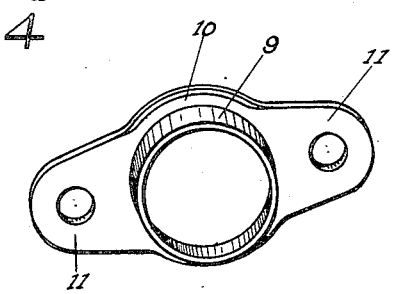
INVENTOR
EDWARD MOORE
BY
A. D. T. Libby
ATTORNEY Patented Jan. 8, 1924.

1,480,096

UNITED STATES PATENT OFFICE.

EDWARD MOORE, OF NEWARK, NEW JERSEY, ASSIGNOR TO SPLITDORF ELECTRICAL COMPANY, OF NEWARK, NEW JERSEY.

ADJUSTABLE FLEXIBLE SHAFT COUPLING.

Application filed October 7, 1921. Serial No. 503,065.

*To all whom it may concern:*

Be it known that I, EDWARD MOORE, a citizen of the United States, residing at Newark, in the county of Essex, State of New Jersey, have invented certain new and useful Improvements in Adjustable Flexible Shaft Couplings, of which the following is a description, reference being had to the accompanying drawing and to the figures of reference marked thereon.

This invention relates to couplings for shafts which permits one shaft to drive another even though slightly disaligned and which also permits one shaft to be rotationally angularly adjustable with respect to the other.

The objects of this invention are to provide a simple inexpensive coupling of this character and one which permits convenient adjustment of the shaft after the coupling members have been secured to their respective driving and driven shafts.

My invention is disclosed in the following specification and drawings in which—

Figure 1 discloses a side view of my coupling applied to the driving and the driven shafts.

Figure 2 is a front view thereof, one of the clamps and its nut being removed, a locking plate being shown out of engagement with the hub.

Figure 3 is a perspective view of one of my retaining clamps.

Figure 4 is a sectional view through my coupling.

Figure 5 is a perspective view of a strengthening coupling flange.

Figure 6 is a perspective view of the adjustable hub, and

Figure 7 is a perspective view of one of my locking plates.

Now referring to the drawings more in detail and in which like reference characters in the several figures refer to like parts, 1 indicates a driving shaft, and 2 the driven shaft, which may for example be the rotor shaft of a magneto 3. Secured to the rotor shaft as by means of a nut 4 is a spider 5 having arms 6, only one of which is shown, each arm being tapped to receive a bolt 7 passing through a flexible disc 8 which may be made of any suitable material such as vulcanized fabric or leather. This disc has a circular opening in which fits the hub 9 of a coupling flange 10. The flange 10 has two perforated ears 11 and bolts 12 pass through the disc and the perforations in the ears to bind the same together, suitable cup-shaped washers 25 being used as will be readily understood. Fitting snugly within the hub of the coupling flange 10 is the adjustable hub 13. This hub has a toothed annular ring 14 engageable with slidable locking plates 15 each provided with an elongated opening 16 embracing the bolts 12 so that the plates may be moved radially away from the center of the coupling. The plates have teeth 17 adapted to engage with the teeth on the ring 14 to prevent rotational movement of the hub in the coupling flange. The hub is further provided with a keyway 18 for securing the same against rotation on the drive shaft. Upon shifting the plates outwardly from the center or by removing them, the coupling flange may be rotated with respect to the hub to adjust the angular relationship between the drive and the driven shafts. To secure the plates against accidental displacement and to prevent the hub from being withdrawn laterally from the coupling flange, retaining clamps 19 are provided. Each clamp is provided with an opening 20 to fit the bolt 12 and a lip 21 flared slightly away from the body of the clamp, so that when the clamp is applied over the bolt and drawn down as by the castellated nut 22, the flared lip will embrace the edges of the plate 15 and force the same inwardly toward the center of the hub to cause the teeth of the plate to interlock firmly with the teeth on said hub. The clamp in itself is so shaped that the free ends of the lip form teeth 23 to engage with the hub teeth to hold the hub against rotation in the coupling flange. The upper surface of the clamp is extended so as to form an annular rim 24 sufficient to embrace the ring of the hub, thereby preventing withdrawal of the same from the coupling flange. It is to be understood that the clamp in itself with its two teeth is sometimes sufficient to retain the hub against rotational movement, but with the provision of my locking plate I minimize the chances of the hub slipping around in the coupling flange.

The above construction provides a ready means for rotating the magneto shaft with respect to the drive shaft for properly timing the magneto with respect to the engine, the construction of the various parts being very simple.

Having thus described my invention what I claim is:

1. An adjustable coupling comprising a disc, a driven shaft coupling member secured thereto, a driving hub rotatably adjustable with respect to said disc, teeth on said hub, clamping members having a peripherally disposed lip terminating in a pair of teeth at its free ends for engaging said teeth on the hub at points a considerable distance apart, and means passing through said disc and clamping members for securing the parts together in co-operative relationship.

2. An adjustable coupling comprising a disc, a driven shaft coupling member secured thereto, a coupling flange on said disc provided with perforated ears for the reception of securing means, a driving hub rotatably adjustable with respect to said flange, teeth on said hub, clamping members having a peripherally disposed lip terminating in a pair of teeth at its free ends for engaging said teeth on the hub at points a considerable distance apart, and means passing through said disc, perforated ears and clamping members for securing the parts together in co-operative relationship.

3. An adjustable coupling comprising a disc, a driven shaft coupling member secured thereto, a driving hub rotatably adjustable with respect to said disc, teeth on said hub, separate locking plates having teeth to engage the teeth on the hub, clamping members embracing the edges of and moving the locking plates to force the teeth thereof into engagement with the teeth on the hub, and means passing through said disc, plates and clamping members for securing the parts together in co-operative relationship.

4. An adjustable coupling comprising a disc, a driven shaft coupling member secured thereto, a coupling flange on said disc provided with perforated ears for the reception of securing means and further provided with a hub, a driving hub positioned within the flange hub and rotatably adjustable with respect to said flange, teeth on said driving hub, toothed locking plates for engaging the teeth on the driving hub, clamping members for engaging and moving the locking plates to force the teeth thereof into engagement with the teeth on the hub, and means passing through said disc, perforated ears, plates and clamping members for securing the parts together in co-operative relationship.

5. An adjustable coupling comprising a disc, a driven shaft coupling member secured thereto, a driving hub rotatably adjustable with respect to said disc, teeth on said hub, separate locking plates having teeth to engage the teeth on the hub, clamping members having a flared lip for fitting over and moving the locking plates to force the teeth thereof into engagement with the teeth on the hub, and means passing through said disc, plates and clamping members for securing the parts together in co-operative relationship.

6. An adjustable coupling comprising a disc, a driven shaft coupling member secured thereto, a driving hub rotatably adjustable with respect to said disc, teeth on said hub, clamping members having teeth only on opposite corners for engaging said teeth on the hub at points spaced a considerable distance apart and for securing said hub against lateral displacement with respect to said disc, and means passing through said disc and clamping members for securing the parts together in co-operative relationship.

7. An adjustable coupling comprising a disc, a driven shaft coupling member secured thereto, a coupling flange on said disc provided with perforated ears for the reception of securing means, a driving hub positioned within the flange hub and rotatably adjustable with respect to said flange, teeth on said hub, clamping members having teeth only on opposite corners for engaging said teeth on the hub at points spaced a considerable distance apart and for securing said hub against lateral displacement with respect to said flange, and means passing through said disc, perforated ears and clamping members for securing the parts together in co-operative relationship.

8. An adjustable coupling comprising a disc, a driven shaft coupling member secured thereto, a coupling flange on said disc provided with perforated ears for the reception of securing means, a driving hub positioned within the coupling flange and rotatably adjustable with respect to said flange, teeth on said hub, locking plates having teeth to engage the teeth on the hub, clamping members for engaging the outer rim of said locking plates to move the same radially toward said shaft and force the teeth on the locking plates into engagement with the teeth on the hub and for securing said hub against lateral displacement with respect to said flange, and means passing through said disc, perforated ears, plates and clamping members for securing the parts together in co-operative relationship.

In testimony whereof, I affix my signature.

EDWARD MOORE.